March 18, 1969  A. M. LEITZEL  3,433,497
ENCLOSED LEG GOLF CART SUSPENSION
Filed Oct. 10, 1966  Sheet 1 of 3
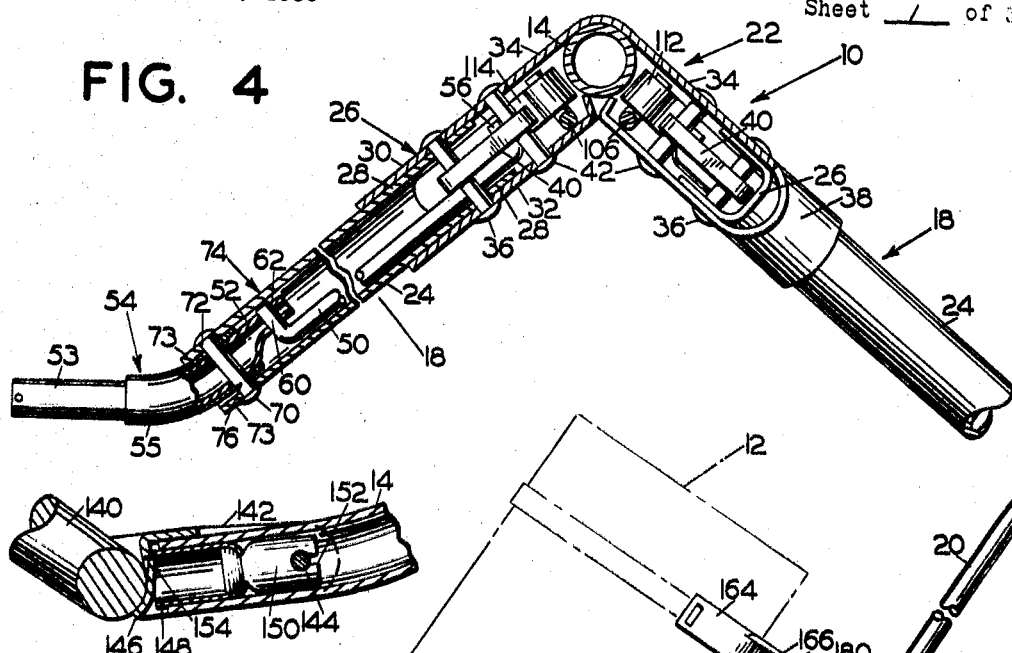
FIG. 4
FIG. 10
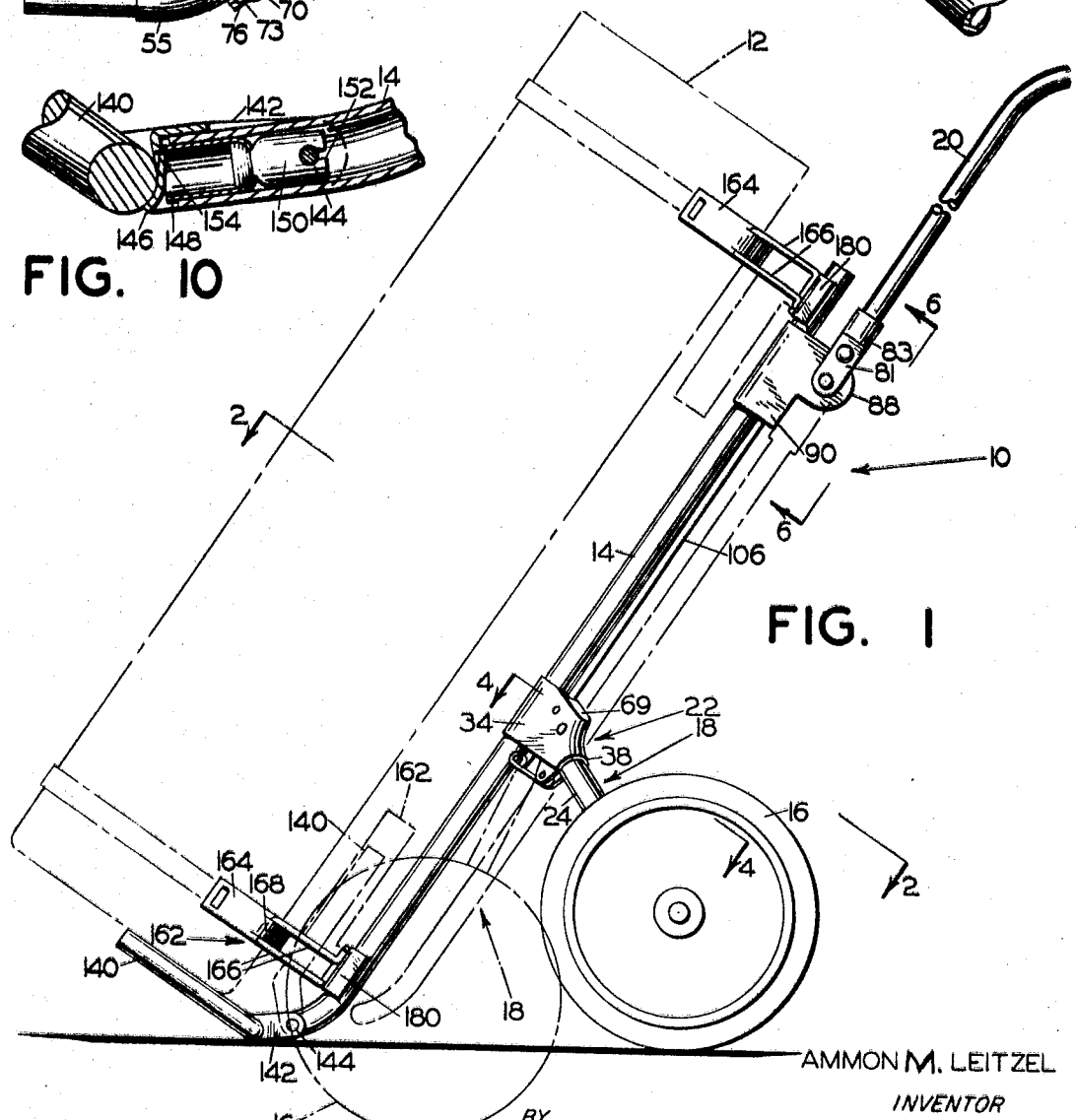
FIG. 1
AMMON M. LEITZEL
INVENTOR
BY
BUCKHORN, BLORE, KLARQUIST & SPARKMAN
ATTORNEYS

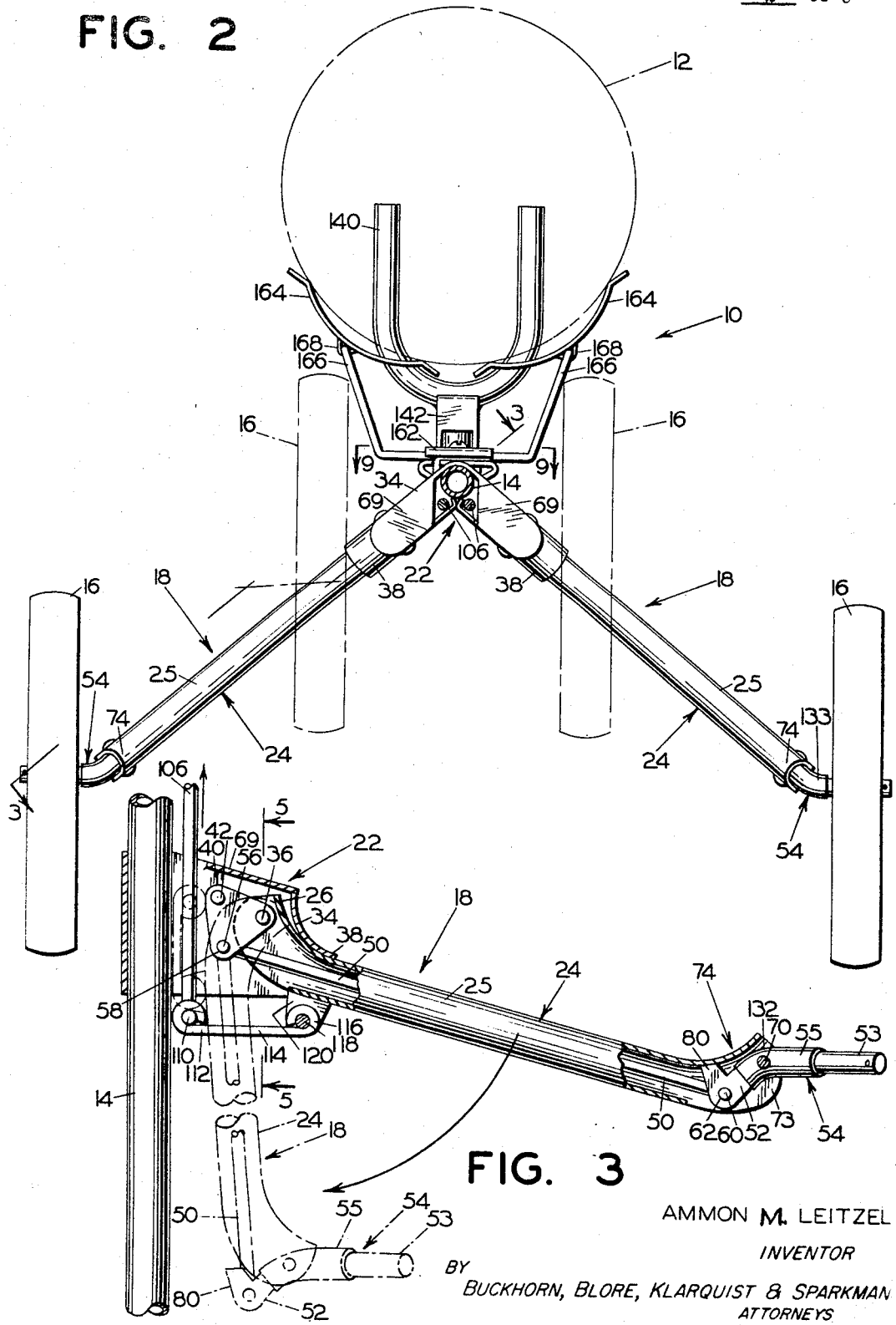

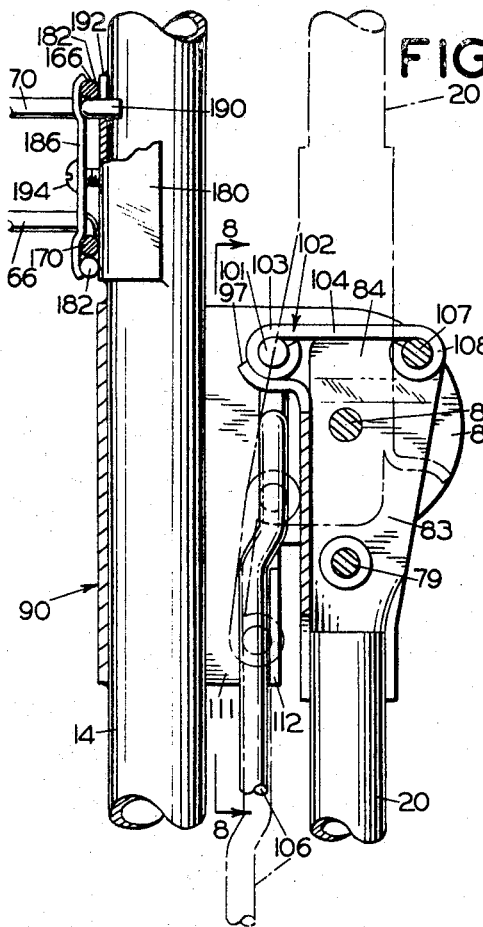
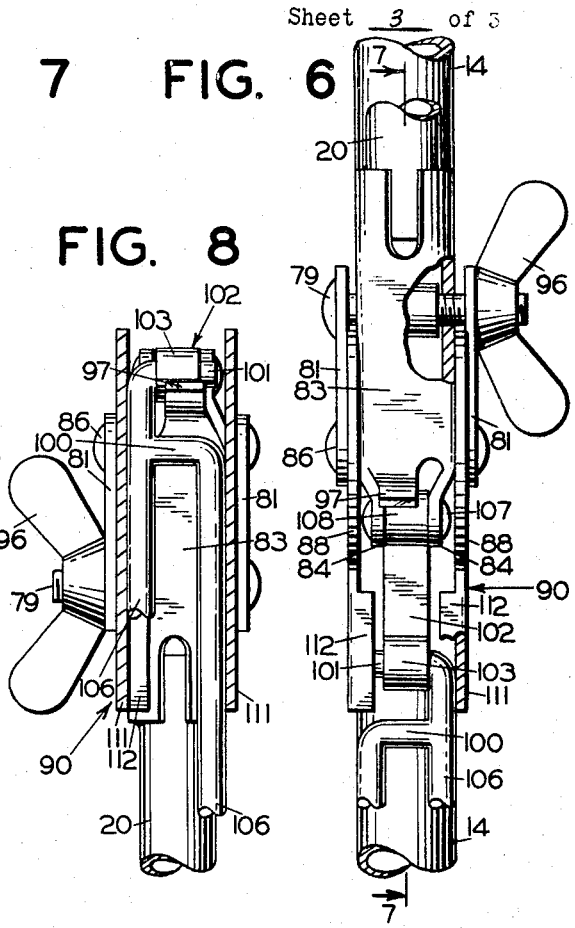
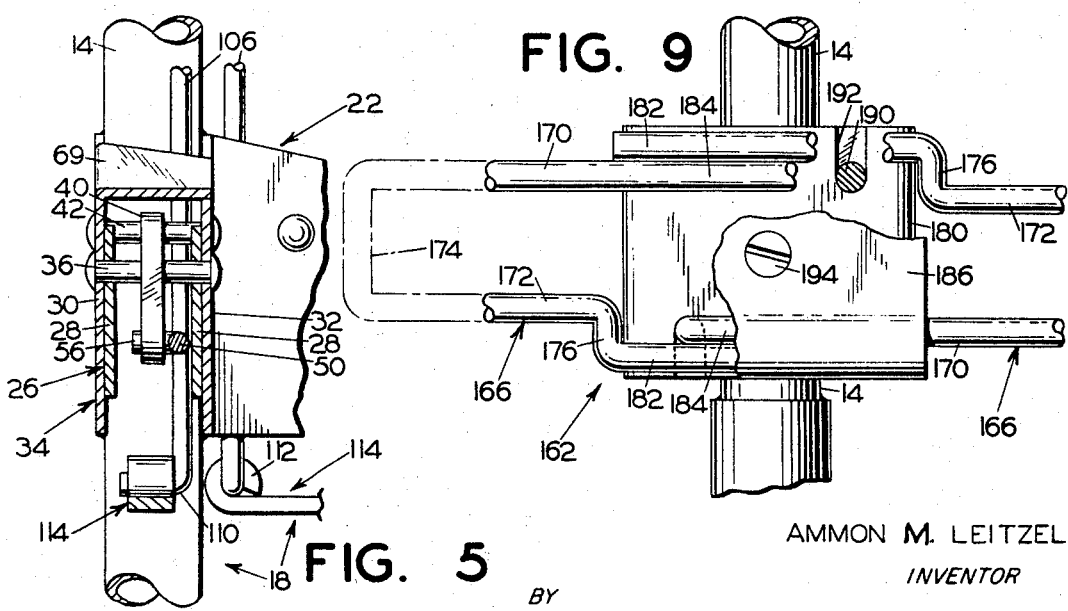

United States Patent Office 3,433,497
Patented Mar. 18, 1969

3,433,497
ENCLOSED LEG GOLF CART SUSPENSION
Ammon M. Leitzel, Portland, Oreg., assignor to Jarman-Williamson Company, Portland, Oreg., a partnership
Filed Oct. 10, 1966, Ser. No. 585,559
U.S. Cl. 280—40
Int. Cl. B62b 3/02
19 Claims

ABSTRACT OF THE DISCLOSURE

A golf cart includes hollow legs carrying wheels and foldable by rods slidable in the legs and connected to the wheels. Linkages are slidable between a block mounting the legs and the body and are connected to the handle for actuating the rods to extend or fold the legs. Strap brackets are movable between folded and extended positions. A tubular bag support is mounted for movement to an extended position projecting outwardly from the bottom of the body from a latched, folded position extending upwardly along the body.

This invention relates to an improved golf cart, and more particularly to an enclosed leg golf cart suspension.

An object of the invention is to provide an improved golf cart.

Another object of the invention is to provide an enclosed leg golf cart suspension.

Another object of the invention is to provide a golf cart leg structure in which a U-shaped, tubular leg mounts an axle pivotally and a rod in the hollow leg forms a parallelogram linkage with the leg, the axle and a member carried by a body of a golf cart.

A further object of the invention is to provide a golf cart suspended by parallelogram leg structures in which pinching of an operator's fingers is prevented.

Another object of the invention is to provide a folding leg suspension for a golf cart in which a push rod connected to an arm of an axle is slidable and movable transversely in a hollow leg enclosing the rod and pivotal relative to a body of the cart by a handle of the cart.

Yet another object of the invention is to provide an improved actuating mechanism for a folding golf cart.

The invention provides an improved golf cart in which a pair of tubular hollow legs pivotal on a block structure secured to a body of the cart enclose push rods pivoted to the block structure and also pivoted to arms of wheel-mounting axles which are pivotally mounted on the lower ends of the hollow legs. Preferably links secured to the hollow legs extend upwardly to a toothed actuating member operable by a foldable, cart manipulating handle pivotal on the cart body to move the legs between folded and running positions. Preferably, the legs are one-piece tubes having channel-like projections at the lower ends thereof which mount pins pivotally mounting the axles. The push rods preferably have laterally bent lower ends fitting closely and rotatably in holes in the arms of the axles and laterally bent upper ends fitting closely and rotatably in mounting plates mounted rigidly on the cart body and also pivotally mounting the upper ends of the tubular legs. Preferably, the upper ends of the links are connected to a chain-like link slidable along the body and operable by a sprocket carried by the handle.

A complete understanding of the invention may be obtained from the following detailed description of an improved golf cart forming one embodiment of the invention, when read in conjunction with the appended drawings, in which:

FIG. 1 is a side elevation view of a golf cart forming one embodiment of the invention;

FIG. 2 is a sectional view taken along line 2—2 of FIG. 1;

FIG. 3 is an enlarged, sectional view taken substantially along line 3—3 of FIG. 2;

FIG. 4 is an enlarged, horizontal sectional view taken along line 4—4 of FIG. 1;

FIG. 5 is an enlarged, vertical sectional view taken along line 5—5 of FIG. 3;

FIG. 6 is an enlarged rear elevation view taken along line 6—6 of FIG. 1;

FIG. 7 is an enlarged, vertical sectional view taken substantially along line 7—7 of FIG. 6;

FIG. 8 is an enlarged, vertical sectional view taken along line 8—8 of FIG. 1;

FIG. 9 is an enlarged, sectional view taken along line 9—9 of FIG. 2; and

FIG. 10 is an enlarged, fragmentary, vertical sectional view of the lower end of the golf cart of FIG. 1.

Referring now in detail to the drawings, there is shown therein a golf cart 10 (FIG. 1) for carrying a golf bag 12. The cart includes a cart body 14 comprising a single tube and supported, when running, by wheels 16 through parallelogram type, enclosed leg mechanisms 18, which are adjustable relative to the body 14 by a foldable handle 20 between storage positions shown in broken lines in FIGS. 1 and 2 and lying along the cart body and extended or running positions shown in full lines in FIGS. 1 and 2. A block structure 22 (FIGS. 3 and 4) fixed rigidly to the body 14 mounts the leg mechanisms 18 pivotally thereon. Each leg mechanism includes a U-shaped tube or outer leg 24 having a straight central portion 25 and a laterally extending, channel-like upper end portion 26 (FIGS. 3, 4 and 5) having flat sides 28 fitting closely between opposed walls 30 and 32 of a generally U-shaped bracket portion 34 of the block structure 22. A rivet 36 secured to the bracket portion 34 mounts the tube 24 pivotally on the bracket and a flared portion 38 of the bracket portion serves as a stop to limit outward movement of the tubular outer leg 24 relative to the body 14. A thick, rigid plate 40 is mounted on the rivet 36 and a rivet 42 fixed to the bracket portion 34. There are, of course, two of the bracket portions 34, one for each tube 24, joined together by a loop portion 43 which is suitably secured to the body 14 by, for example, brazing, and the two bracket portions extend laterally from the body preferably at an angle of 90° relative to each other so that the leg mechanisms 18 are movable in planes at 90° relative to each other.

Each leg mechanism 18 is of a parallelogram type and includes the tube or outer leg 24, the plate 40, a push rod 50 and a rigid, plate-like or flattened arm 52 of a rigid, tubular, axle sleeve 53 of an axle 54 mounting one of the wheels 16. The axle also includes a strengthening sleeve 35. An upper, laterally extending end portion or semi-hook 56 of the rod 50 extends through a hole 58 in the plate 40, and a lower, laterally extending portion or semi-hook 60 of the push rod extends through a hole 62 in the arm 52. The rod 50 extends through and is enclosed or covered by the tube 24. The tube 24 confines the rod 50 to positions in which the end portions 56 and 60 cannot slip out of the holes 58 and 62. The rod 50 is not greater in diameter than about one-third of the inner diameter of the tube 24 and the length of the end portions 56 and 60 and thickness of the arm 52 are sufficient to prevent movement of the end portion 60 out of the hole 62. The length of the end portion 56 and thickness of the plate 40 are sufficient to prevent movement of the end portion 56 out of the hole 58 and the hollow leg 24 maintains the semi-hook 60 in the hole 62. Bent over covers 69 enclose the tops of the bracket portions 34.

Each axle 54 (FIG. 4) is pivotally mounted on a rivet 70 mounted in holes 72 in walls 73 of a laterally extending, channel-like, lower end portion 74 of the tube 24, the rivet 70 being laterally outside the straight central portion 25 of the tube 24 and near the end of the lower end portion 74. The rivet 70 extends through a hole 76 in the axle 54, and the axis of the hole 76 is spaced from the hole 62 a distance sufficient that the effective length of the arm 52 is quite long, and good leverage is provided. The outer end of the portion 74 of the tube 24 acts as a stop to limit counterclockwise movement of the axle 54 relative to the tube 24, as viewed in FIG. 3, and engages the axle when the leg mechanism is in its folded or storage position. When the leg mechanism is in its running position, a laterally projecting stop portion 80 of the arm 52 engages the tube 24 while so held by the push rod 50.

The end portions 26 and 74 (FIGS. 3 and 4) of the tube 24 lie in the same plane. The end portion 26 extends laterally from the longitudinal axis of the tube 24 and the holes therein mounting the rivet 36 are spaced out near the end of the end portion 26 to make the distance from the rivet 36 to the hole 58 in the plate 40 long to provide good leverage to this portion of the linkage structure. Similarly, the holes 72 (FIG. 4) in the lower end portion 74 are out near its end to make the distance between the rivet 70 and the hole 62 in the arm portion 52 long to impart good leverage to this portion of the linkage structure. The walls 73 of the end portion 74 are flat and parallel to each other and bracket the axle closely to confine the axle against lateral movement.

The handle 20 (FIGS. 1, 6 and 7) has a rigid, U-shaped fork 83 of sheet metal brazed thereto. A clamping bolt 79 extends through the fork 83 and braking plates 81. The fork 83 is rotatable on a rivet 86 carried by spaced, rounded plates 88 of an upper block 90 rigidly fixed to the upper end portion of the body 14. The plates 88 interleave the braking members 81 and the fork 83 to present a multiple disc, braking or locking engagement when a nut 96 is manually tightened on the bolt 79 to prevent rotation of the disc 84 on the rivet 86. The adjacent faces of the fork 83 and the plates 81 and 88 may be toothed or knurled if desired. When the nut 96 has been loosened, the handle 20 can be moved between its upwardly extending, operative or running position and its downwardly extending, folded or storage position.

The fork 83 has a tooth 97 (FIG. 7) adapted to mesh with eye portion 103 of a plate-like link 102, and the ends of the members of the fork engage body 104 of the link 102. Transverse end portion 101 of joined actuating rods 106 projects pivotally through eye portion 103 of the link 102 to connect the rods to the link 102. Transverse end portion 100 of one of the rods 106 extends to the other rod 106 and is fixed rigidly thereto. A pin 107 projecting through an eye portion 108 of the link 102 is fixed pivotally to the fork 83. When the handle 20 is moved from its extended position shown in FIG. 6 to its folded storage position shown in full lines in FIG. 7, the link 102 is pulled from its lower, vertically extending position shown in broken lines in FIG. 7 to its upper, horizontally extending position shown in full lines in FIG. 7. The link 102 is, so to speak, rolled around the sprocket-like fork 83 and the end of the fork 83 and the tooth 97 of the link 102 in a sprocket-like action. This pulls the actuating rods 106 upwardly from lower, running positions to upper, storage positions thereof to fold the leg mechanisms 18. To extend the leg mechanisms to their running positions, the handle 20 is moved from its folded position to its upper, running position and is clamped in the latter position by tightening the nut 96 on the bolt 79. This movement of the handle 20 pushes the rods 106 downwardly and pushes the link 102 into a vertical guide portion 111 of the plates 88, which, with the disc 84 and overhanging flanges 112 of the plates 88, confine or guide the link 101. By the above-described chain-and-sprocket-like actuator structure a long throw of the actuator rods is obtained while keeping the moving parts compact and enclosed within the block 90.

The rods 106 (FIG. 3) lie along the body 14 and extend through openings between the covers 69 and the body. Lower end portions 110 of the rods 108 extending laterally of the rods extend through eye portions 112 of strap-like links 114. The body 14, the brackets 34 and the edges of the thick plates 40 form guideways for the links 114 and the rods 106. Eye portions 116 of the links 114 are secured by pins 118 to clevis portions or brackets 120 fixed rigidly to the tubes 24. Preferably, lower edges of the brackets 34 are below the link 114 so that the links are fully within the brackets 34. When the handle 20 is in its upwardly extending operative position, the rods 106 are in their lowermost positions and the link 114 is in its lowermost position holding the leg mechanisms 18 in their outer or running positions. In this position of the handle the eye portions 112 abut the body 14 and the tubes 24 are pressed tightly against the portions 38 of the brackets 34. When the handle is folded to its downwardly extending storage position, the leg mechanisms 18 are held in storage positions alongside the body 14.

Each axle 54 has two elbow portions 132 and 133 (FIGS. 2 and 3). The angles of the elbow portions 132 and 133 are such that the outer ends of the axle sleeves 53 always extend directly away from each other both when the leg mechanisms are folded and when they are in the running positions thereof. That is, the outer ends of the axle portions are aligned with each other and are horizontal at least while the leg mechanisms are in these extreme positions. The linkage of each leg mechanism 18 need not be a perfect parallelogram but should be close thereto and such that the outer ends of the axle portions are maintained in alignment with each other when the legs are in their extreme positions and substantially in alignment for positions of the legs intermediate their extreme positions.

A U-shaped, tubular bag support 140 (FIGS. 1, 2 and 10) is mounted by a hinge fork 142 and a pin 144 on the lower end of the body 14 for folding movement between a bag supporting, outwardly extending position and a folded, shipping position extending upwardly along the body 14. When the support 140 is pivoted from its folded shipping position to its operative position, a cam portion 146 (FIG. 10) of the fork 142 presses a tubular latching plug 148 and a rubber grommet 150 farther into the tubular body 14 to slide a split end portion 152 of the grommet over the pin 144 and then compress the grommet 152 longitudinally, as shown in FIG. 10. As the support reaches its operative position, the cam portion 146 moves off the plug 148 which then is pressed by the grommet over edge 154 of the cam portion to lock the support in its operative position. While the support is in its folded position the plug 148 is only partly inserted into the body 14 with the end of the grommet engaging the pin 144 and the plug extends under the cam portion 146 to hold the support 140 in its folded position.

Foldable upper and lower strap-holding bracket devices 160 and 162 (FIGS. 1, 2, 7 and 9) are identical in structure and only the device 162 will be described in detail. The device 162 includes arcuate bracket members 164 to which a strap can be secured. The bracket members 164 are carried by two generally U-shaped rods 166 hinged to loops 168 at opposite sides of the member 164. Each rod 166 includes a pair of arms 170 and 172 joined by a bight portion 174. Heel portions 176 extend laterally from the arms and abut a mounting plate 180 fixed rigidly to the body 14 when the bracket 162 is in its operative or unfolded position. Portions 182 and 184 of the rods are clamped in side-by-side positions against the mounting plate 180 by a grooved clamping plate 186, which also clamps the upper ones of the portions 182 and 184 against the mounting plate 180 when the bracket 162 is in unfolded position. Tang portions 190 extend transversely from the portions 184 into sockets 192 in the mounting plate to lock the rods 166 to the mounting plate. A single screw 194 is threaded into a tapped bore in the mounting plate 180 to pull the clamping plate tightly against the rods 166. The screw may be unscrewed to permit manual removal of the portions 188 and 190 from between the plates 180 and 186, and then retightened to clamp only the upper ones of the portions 182 and 184 after the bracket 162 has been moved to its folded position as shown in broken lines in FIG. 1.

The above-described cart is very rugged, while inexpensively constructed, primarily from tubular stock, rods and sheet metal stampings. The tubes 24 are the only visible portions of the parallelogram type leg mechanisms 18 to provide a trim appearance, and the mechanisms of the legs and the actuator therefor are substantially pinch free and lock rigidly in their extreme positions. The tubes 24 may be constructed of tubular stock with the end portions 26 and 74 bent, split and formed. The end portions 26 annd 74 are identical in construction so that they may be formed by the same method and apparatus.

What is claimed is:
1. In a golf cart,
a body,
block means carried by the body,
a pair of tubes pivotally secured to the block means,
a pair of axle members pivotally mounted on the tubes,
a pair of wheels mounted on the axle members,
a pair of rods in the tubes and connected pivotally to the block means and the axle members,
a pair of linkages connected to the tubes and extending upwardly therefrom along the body and between the body and the block means,
a handle connected pivotally to the body at a point above the block means,
and means coupling the upper ends of the linkages to the handle for swinging the tubes relative to the body.

2. The golf cart of claim 1 wherein each of the linkages includes a first link member extending along the body and a second link member connecting the lower end of the first link member to one of the tubes and movable between the body and the block means.

3. The golf cart of claim 1 wherein the block means includes guide structure guiding the linkages along the body.

4. The golf cart of claim 1 wherein each of the axle members includes an axle portion and an arm positioned on opposite sides of the portion of the axle member pivotally connected to one of the tubes,
the arm portions having laterally extending holes therein,
the end portions of the rods extending laterally of the rods and extending into the holes in the arm portion to connect the rods pivotally to the arm portions.

5. In a golf cart,
a body,
block means carried by the body,
a pair of tubes having split end portions generally U-shaped in transverse cross section and pivotally secured to the block means,
a pair of axle members pivotally mounted on the tubes,
a pair of wheels mounted on the axle members,
a pair of rods in the tubes and connected pivotally to the block means and the axle members,
a pair of linkages connected to the tubes and extending upwardly therefrom along the body,
a handle connected pivotally to the body,
means coupling the upper ends of the linkages to the handle for swinging the tubes relative to the body,
the block means including a housing portion,
and pin means extending through the housing portion and the upper end of one of the tubes to mount the upper end of the last-mentioned tube pivotally in the housing portion,
the block means also including a plate-like block member laterally from the walls of the housing mounted in a fixed position in the housing portion above the upper end of the last-mentioned tube and connected pivotally to the upper end of the rod in the last-mentioned tube, the upper end of the last mentioned rod having a hook portion extending through the block member to form a pivot connection with said block member, the split upper end portions of the last mentioned tube serving to bracket the sides of the hook portion at least when the last mentioned tube is in a folded position relative to the body.

6. The golf cart of claim 5 wherein the block member comprises a plate mounted on the pin means,
the block means also including second pin means spaced laterally from the first-mentioned pin means and extending through the housing and the plate to mount the plate rigidly in the housing.

7. In a golf cart,
a body member,
a hollow block member secured to the body member,
a plate member fixed rigidly in the block member in a position spaced from the walls of the block member,
a tubular leg member having split end portion extending upwardly into the block member and into the spaces between the plate member and the block member, to bracket the plate member,
pin means connecting the tubular leg member pivotally to the block member,
a push rod in the tubular leg member and having a hooked upper end portion connected pivotally at the upper end thereof to the plate member and extending into the space between the plate member and the block member and between the sides of the split upper end portions of the tubular leg member,
a wheel,
an axle mounting the wheel and connected pivotally to the leg member and the push rod at points spaced along the axle member,
and means for moving the leg member relative to the body.

8. The golf cart of claim 7 wherein the hollow block member includes a stop portion limiting pivotal movement of the leg member outwardly relative to the body member.

9. The golf cart of claim 7 wherein the leg member is a tube and the upper end portion thereof is split and straddles the plate member.

10. In a golf cart,
an elongated, generally vertical body,
block means mounted on the body,
a tubular leg member having a substantially straight central portion, a lower end portion and an upper end portion extending laterally in a predetermined direction from the central portion,
means connecting the upper end portion of the tubular leg member pivotally to the block means at a predetermined point on the upper end portion near the end thereof,
a pusher rod mounted slidably in the tubular leg member,
means pivotally connecting the upper end of the push rod to the block means at a point spaced from said predetermined point,
axle means,
a wheel mounted on the axle means,
means mounting the axle means pivotally on the lower end portion of the leg member at a second predetermined point spaced laterally from the central portion of the tube, means connecting the lower end of the push rod pivotally to the axle means at a point spaced from said second predetermined point, and means for holding the leg member in a selected one of two positons relative to the body.

11. The golf cart of claim 10 wherein the lower end portion of the leg member extends laterally from the central portion in the same direction as the upper end portion and said second predetermined point is positioned near the end of the lower end portion of the leg member.

12. In a golf cart, a body, block means on the body, a tubular leg member having an upper end portion pivotally connected to the block means, a substantially straight central portion and a channel-like lower end opening downwardly and extending laterally away from the central portion, an axle member having a central pivot portion, an axle end portion at one end thereof and an arm portion at the other end thereof, a wheel mounted on the axle end portion, means mounting the pivot portion pivotally on the lower end portion of the leg member at a predetermined point thereon spaced laterally outwardly from the central portion of the tube near the end of the lower end portion of the leg member, a push rod mounted in and slidable along the leg member, means connecting the upper end of the push rod pivotally to the block means, means connecting the lower end of the push rod pivotally to the arm portion of the axle member at a point thereon spaced substantially from said predetermined point, and means for holding the leg member selectively in a folded position and an extended position.

13. The golf cart of claim 12 wherein the arm portion has a hole therethrough and the lower end of the push rod extends laterally relative to the push rod and through the hole in the arm portion.

14. In a golf cart, a body, a pair of folding leg mechanisms mounted on the central portion of the body, a pair of wheels on the leg mechanisms, a handle, means mounting the handle pivotally on the upper end portion of the body, coupling means connected to the leg mechanisms for moving the leg mechanisms relative to the body, a first toothed member mounted slidably along the body for moving the coupling means, and a rotatable toothed member meshing with the first toothed member and rotatable by the handle.

15. The golf cart of claim 14 wherein the rotatable toothed member comprises a gear segment fixed to the handle.

16. The golf cart of claim 15 including bolt means carried by the body, the handle including a disc portion having a gripping face and centered on the bolt means, block means secured to the body and mounting the bolt means and having a gripping face adapted to engage the gripping face of the disc portion, and nut means on the bolt means for forcing the disc portion against the block means, the gear segment being mounted on the disc portion and centered on the bolt means.

17. In a golf cart, a body, block means secured to the body and having stop means thereon, a leg mounted pivotally on the block means for movement between a folded position and a running position in which the leg engages the stop means, a wheel on the leg, and an actuating linkage including a link connected pivotally to the leg and serving to wedge against the body when the leg is in its running position engaging the stop means, whereby the leg is rigidly held against the stop means.

18. The golf cart of claim 17 wherein said link extends substantially perpendicularly to the body when the leg is in its running position.

19. The golf cart of claim 18 wherein said link extends along the body when the link is in its folded position.

References Cited

UNITED STATES PATENTS 3,265,402   8/1966   Snyder.
3,079,166   2/1963   Abgarian.

LEO FRIAGLIA, *Primary Examiner.*

ROBERT R. SONG, *Assistant Examiner.*